United States Patent [19]
Schmidt

[11] Patent Number: 5,912,621
[45] Date of Patent: Jun. 15, 1999

[54] CABINET SECURITY STATE DETECTION

[75] Inventor: Thomas Joseph Schmidt, Milford, N.H.

[73] Assignee: Digital Equipment Corporation, Houston, Tex.

[21] Appl. No.: 08/892,138

[22] Filed: Jul. 14, 1997

[51] Int. Cl.[6] .................................................. G08B 13/14
[52] U.S. Cl. ..................... 340/571; 340/568.1; 380/4
[58] Field of Search ..................... 340/540, 541, 340/542, 545, 691, 825.25, 825.31, 568, 571, 687, 568.1; 380/4, 23, 25, 50, 52; 395/186, 188.01

[56] References Cited

U.S. PATENT DOCUMENTS

| | | | |
|---|---|---|---|
| 3,969,584 | 7/1976 | Miller et al. | 340/542 |
| 4,797,663 | 1/1989 | Rios | 340/691 |
| 4,825,200 | 4/1989 | Evans et al. | 340/825.56 |
| 5,189,396 | 2/1993 | Stobbe | 340/541 |
| 5,287,519 | 2/1994 | Dayan et al. | 340/825.31 |
| 5,311,450 | 5/1994 | Ojima | 364/550 |
| 5,317,304 | 5/1994 | Choi | 340/571 |
| 5,341,322 | 8/1994 | Blackledge, Jr. et al. | 380/4 |
| 5,353,015 | 10/1994 | Robinson | 340/686 |
| 5,388,156 | 2/1995 | Blackledge, Jr. et al. | 380/4 |
| 5,450,271 | 9/1995 | Fukushima et al. | 361/686 |
| 5,515,030 | 5/1996 | Citron et al. | 340/545 |
| 5,555,156 | 9/1996 | Decante | 340/825.31 |
| 5,555,373 | 9/1996 | Dayan et al. | 395/188.01 |
| 5,574,786 | 11/1996 | Dayan et al. | 380/4 |
| 5,748,083 | 5/1998 | Rietkerk | 340/568 |

Primary Examiner—Daniel J. Wu
Assistant Examiner—Van T. Trieu
Attorney, Agent, or Firm—Hamilton, Brook, Smith & Reynolds, P.C.

[57] ABSTRACT

A computer cabinet tamper detection system includes a switch that is responsive to the chassis being opened to expose the electronic hardware and an auxiliary state element that changes state in response to the switch. A reporting program runs on the hardware to poll the state of the auxiliary state element when the computer is operational to provide notification regarding a safe or unsafe condition of the chassis. This allows the computer operator and the organization to take steps to contain any damage associated with the possible prejudicing of the computer's security.

15 Claims, 4 Drawing Sheets

CABINET SECURITY STATE DETECTION

BACKGROUND OF THE INVENTION

Due to their role as data storage and management devices, computers face threats from unauthorized access. Various software approaches have been implemented to provide protection. Passwords restrict access to only those users that have knowledge of the password. Firewalls are another software mechanism that protect computers from illegal access via a network.

These software approaches provide little or no protection from physical threats. That is, if someone tries to access the computer by operating the computer, the software can provide a moderately effective barrier. In contrast, if the unauthorized person seeks to access the computer's data by physically opening the computer and reconnecting the hard drive, for example, the software provides no safeguards.

Unfortunately, there is little or no way of cost-effectively hardening a computer against physical attack. In any organization, the computers are typically personal computers that are distributed throughout the organization's facilities, thus any person that has access to the organization's facilities generally may access the computers.

Some approaches have been proposed to detect the physical opening of the computer cabinet. Upon detecting this event, an attempt is made to disable the computer. In one case, the configuration RAM of the computer is cleared. The software or firmware of the computer is then designed to prevent the further operation of the computer in response to this clearance.

SUMMARY OF THE INVENTION

The problem with the prior art approaches is the fact that they misconceive the scope of the threat, and thus, upon detecting a threat, provide a response that can only be annoying to the computer's proper operator who must sometimes open the computer. Absent physical hardening, there is really no effective mechanism for protecting the computer's data in the most common systems. Once the cabinet has been opened, the disk drive can be removed or connected to a different computer to access its contents. At best, the prior art systems may only marginally increase the difficulty with which someone can access the data of the computer while creating great inconvenience to the computer owner who must either remember the protocol for preventing the purging of the computer's configuration data or remember how to re-establish the configuration data after opening.

In the present invention, the opening of the cabinet is detected as in the prior art. In response to detecting cabinet opening, however, the computer is not disabled. Instead, computer's operating system and/or a network monitoring system are notified, when the computer is operational. As a result, the problems and annoyance associated with disabling the computer are avoided. Moreover, there is a notification that allows security personnel to be dispatched. This allows the computer operator and the organization to take steps to contain any damage associated with the possible prejudicing of the computer's security. Moreover, this notification, in itself, provides some level of deterrence since the unauthorized user will, if they are aware of the cabinet security detection system, know that there will be knowledge of their access.

In general, according to one aspect, the invention features tamper detection system for a computer chassis. The system includes a switch that is responsive to the chassis being opened to expose the electronic hardware and an auxiliary state element that changes state in response to the switch even when the computer is off. A reporting program runs on the hardware to poll the state of the auxiliary state element when the computer is operational to provide notification regarding a safe or unsafe condition of the chassis.

In specific embodiments, the auxiliary state element is powered by the battery for the real time clock. In other implementations, however, a capacitive element could be used to supply power over shorter intervals. Preferably, the auxiliary state element comprises a single bit memory device that is reset by the switch to minimize power consumption.

In other aspects of the embodiments, an additional controller functions as an intermediary between the auxiliary state element and an operating system of the computer to detect the state of and reset the auxiliary state element. This component can function as a buffer from the operating system to reset the auxiliary state element only in response to receiving a predetermined code.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
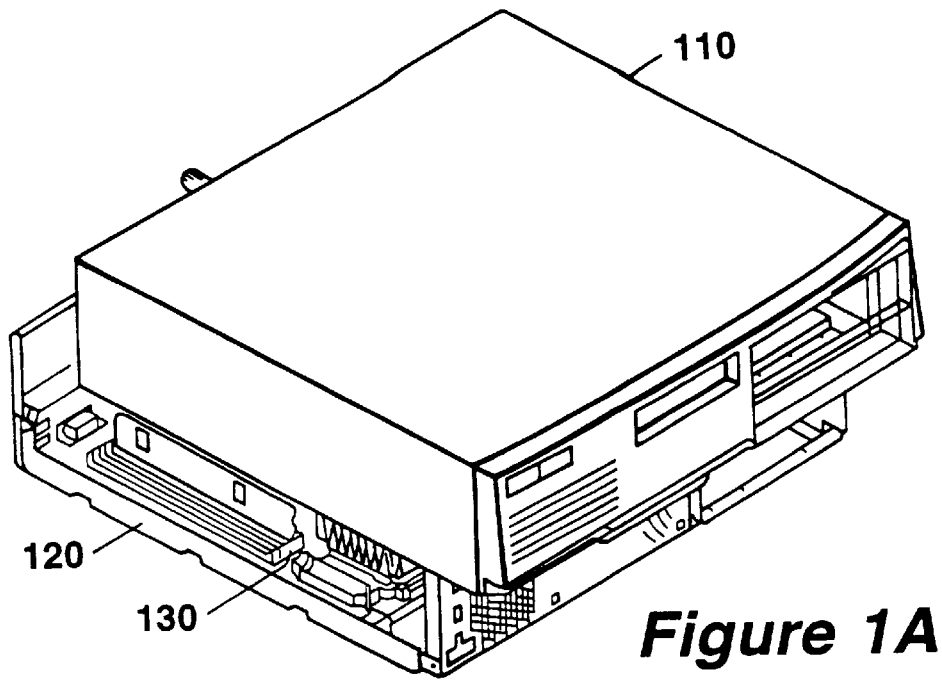
FIGS. 1A and 1B are diagrams illustrating the opening of a computer's cabinet in both the conventional and tower configurations.
Figure 1B:
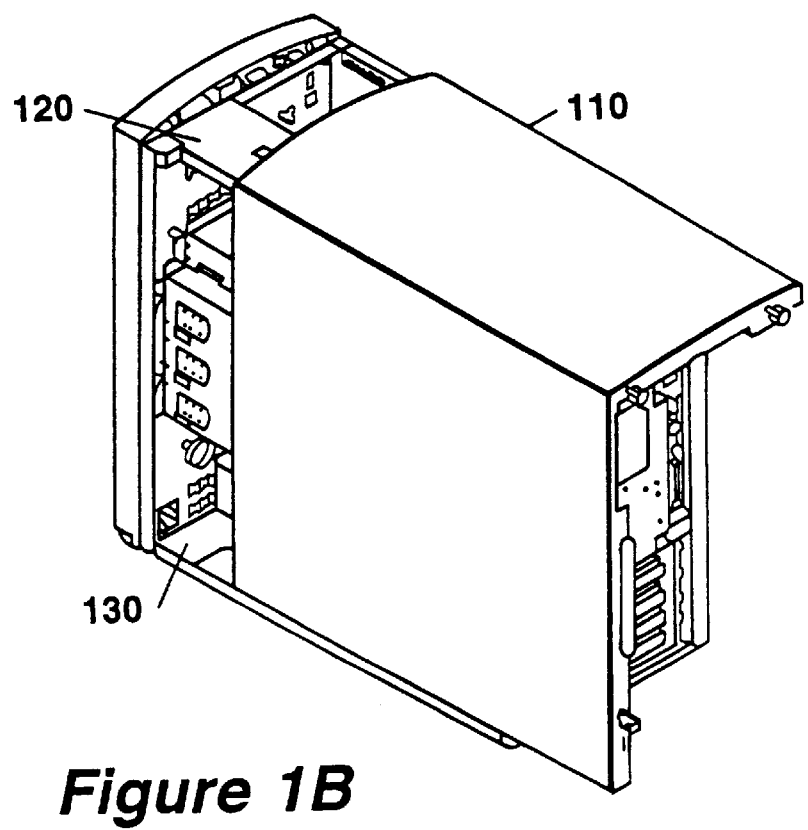

FIGS. 1A and 1B illustrate the opening of the computer cabinet in both conventional and tower configured computers, respectively. A chassis 110, typically constructed from sheet metal, is removed from a frame structure 120. This exposes the inner electronic hardware 130 of the computers.

Figure 2A:
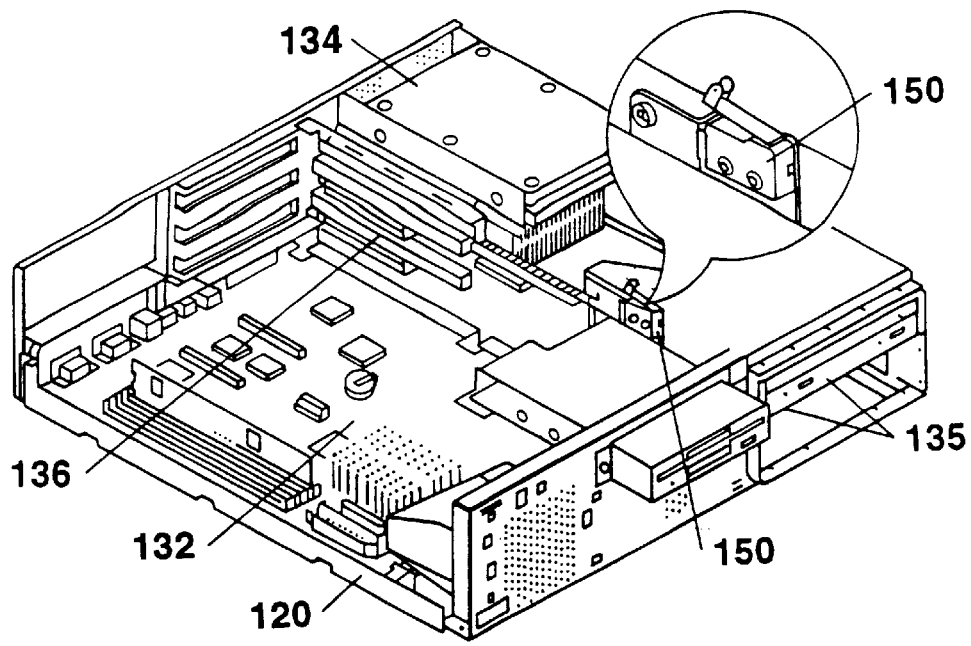
FIGS. 2A and 2B illustrate the placement of the microswitch that detects the removal of the chassis of the cabinet.
Figure 2B:
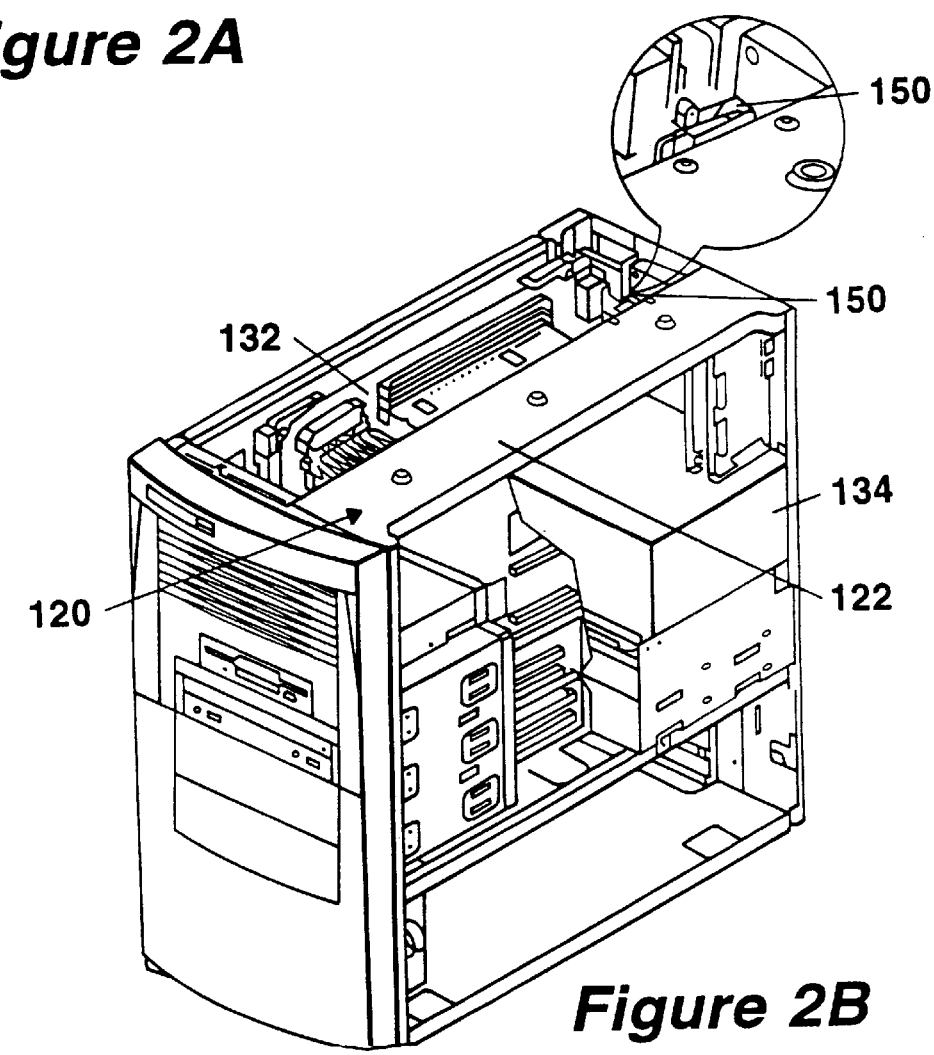

FIGS. 2A and 2B show the electronic hardware 130 in the conventional and tower configurations, respectively. The various components include the motherboard 132, hard drive 134, disk drives 135, and daughterboard slots 136. Microswitches 150 in both the conventional and tower configurations detect the opening of the computer's cabinet when the chassis 110 is removed. In the conventional configuration, the microswitch 150 is attached to the part of the inner metal frame that supports the hard drive 134 and disk drives 135. In the tower configuration, the switch 150 is attached to beam 122 that extends from the front of the computer to the back along the computer's top end.

Other locations for the microswitch are possible. Preferably, it should be located so that it can not be manually held in a closed position during the opening of the cabinet, but will detect the cabinet opening as soon as the chassis 110 has begun to be removed.

Figure 3:
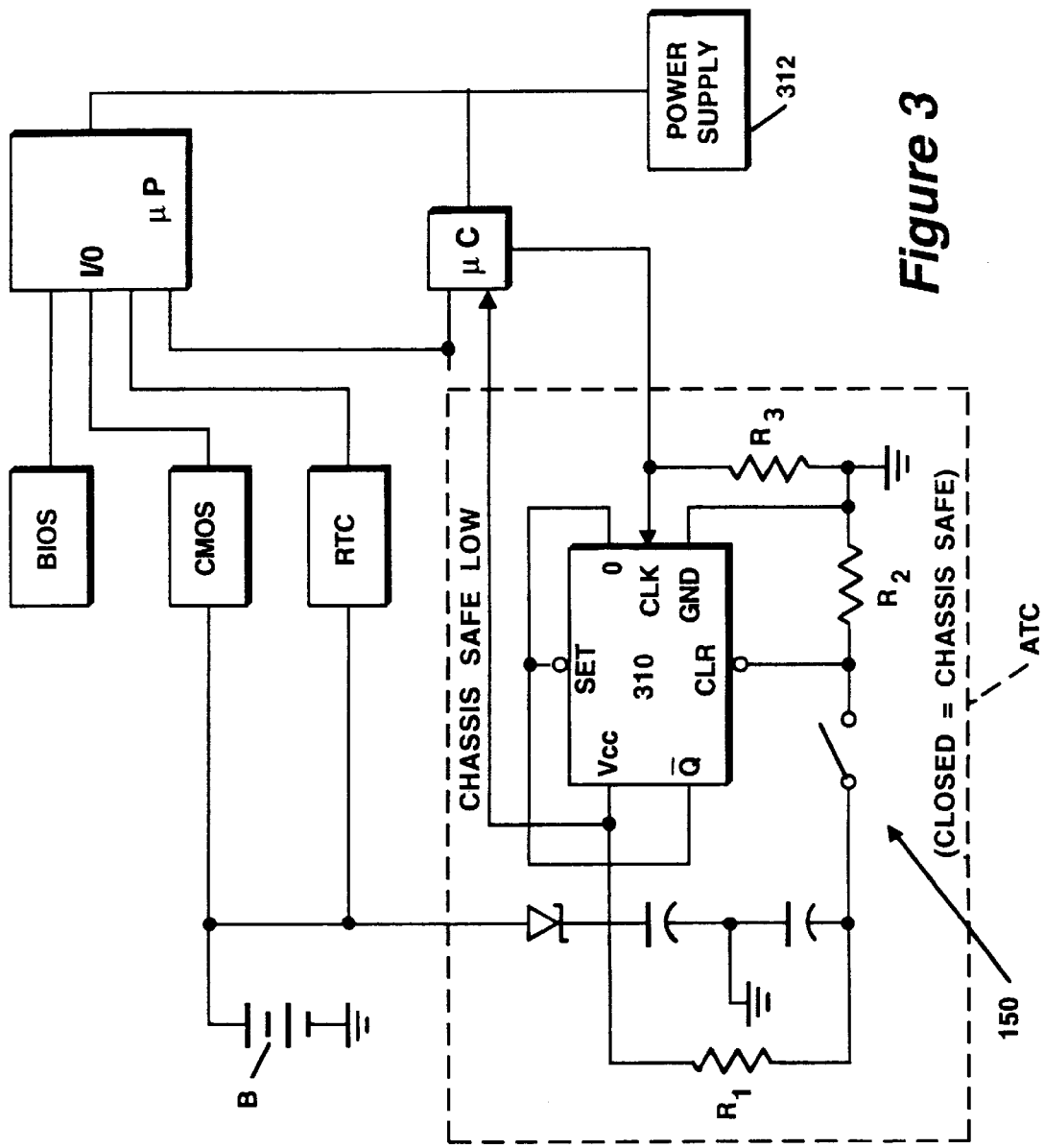
FIG. 3 is a block diagram illustrating the cabinet security state detection system and its relationship to the other components of the computer.

FIG. 3 illustrates the general architecture of a computer and one implementation of the cabinet state security system. The more common components of the computer include the microprocessor $\mu P$, basic input/output system BIOS, configuration memory CMOS, and real time clock RTC. A power supply 312 powers the microprocessor $\mu P$ and an auxiliary microcontroller $\mu C$.

The antitamper circuit ATC comprises an auxiliary state element, which is preferably a D-type flip-flop 310. Its clear terminal C is connected to the switch 150. Its input terminal D, set terminal SET, and power terminal VCC are connected to logic high level voltage supplied by battery B, which also powers the configuration memory CMOS and real time clock RTC. Its clock terminal CLK is connected to the auxiliary microcontroller $\mu C$, and its output $\overline{Q}$ is connected to be read by the auxiliary microcontroller $\mu C$.

The thus connected D-flip-flop 310 is set by the microcontroller $\mu C$ to output a logic-low output. If ever the microswitch 150 is actuated (closed) by the removal of the chassis 110, the clear terminal C is connected to ground. This sets the output $\overline{Q}$ of the D-flip-flop to a logic high, which is indicative of the opening of the cabinet and its unsafe state.

To ensure the detection of the cabinet opening even when the computer is not otherwise operational, the antitamper circuit ATC must be constantly supplied with power. This is provided by operating the auxiliary state element on power supplied by the battery B for the real time clock RTC. As a result, this system will accurately record the opening of the cabinet so long as the battery B has sufficient voltage to power the auxiliary state element. If the system loses power because the battery has insufficient voltage or becomes disconnected from the battery, an unsafe, opened cabinet condition will be indicated.

The ATC also indicates when the chassis has not been properly reinstalled. The D-flip-flop 310 will not reset while the cover is in an unsafe condition. The antitamper circuit ATC will continue to show an unsafe cabinet condition. This technique may be used to ensure that the chassis is properly attached.

According to the invention, the auxiliary state element 310 is only a single bit D-flip-flop storage element. This feature is important because the element has an extremely low power consumption, on the order of a few microamps. This minimalist approach is preferable to the use of larger, multibit storage elements, which could provide more information, because such larger elements would draw more power. This causes the premature aging of the real-time clock battery B. According to the present invention, this auxiliary state element is only a single bit to minimize this power consumption and thus, not substantially impact the operating lifetime of the battery.

Another advantage associated with the minimalist implementation is its low cost. The incremental costs associated with this feature is the cost of the D-flip-flop 310 and the switch 150, when the microcontroller $\mu C$ is already present for other tasks.

The antitamper circuit ATC is preferably controlled only indirectly by the operating system of the computer's microprocessor $\mu P$, with the microcontroller $\mu C$ serving as the buffer. During the operation of the computer, the microcontroller $\mu C$ receives power and polls the status of the auxiliary state element 310, especially when the computer is first booted-up. If the auxiliary state element 310 has been cleared by the opening of the cabinet switch 150 when the computer was off, the controller $\mu C$ detects an unsafe state by a logic high on the chassis safe line. This information can then be transmitted to the operating system of the microprocessor $\mu P$ either by initiating an interrupt sequence to the microprocessor $\mu P$ or only passed to the operating system only when the microcontroller $\mu C$ is polled by the microprocessor $\mu P$.

In one embodiment, the operating system can only reset the auxiliary state element 310 to return to an indication of a safe state of the cabinet 110 in response to passing a proper, predetermined code to microcontroller $\mu C$. This code can be based on a password that the operator enters after being prompted. This feature is important since it prevents the unauthorized user from opening the cabinet, obtaining the desired data from the computer, and then resetting the state element 310 via the operating system to thereby prevent any notification of the unauthorized access to the computer.

Figure 4:
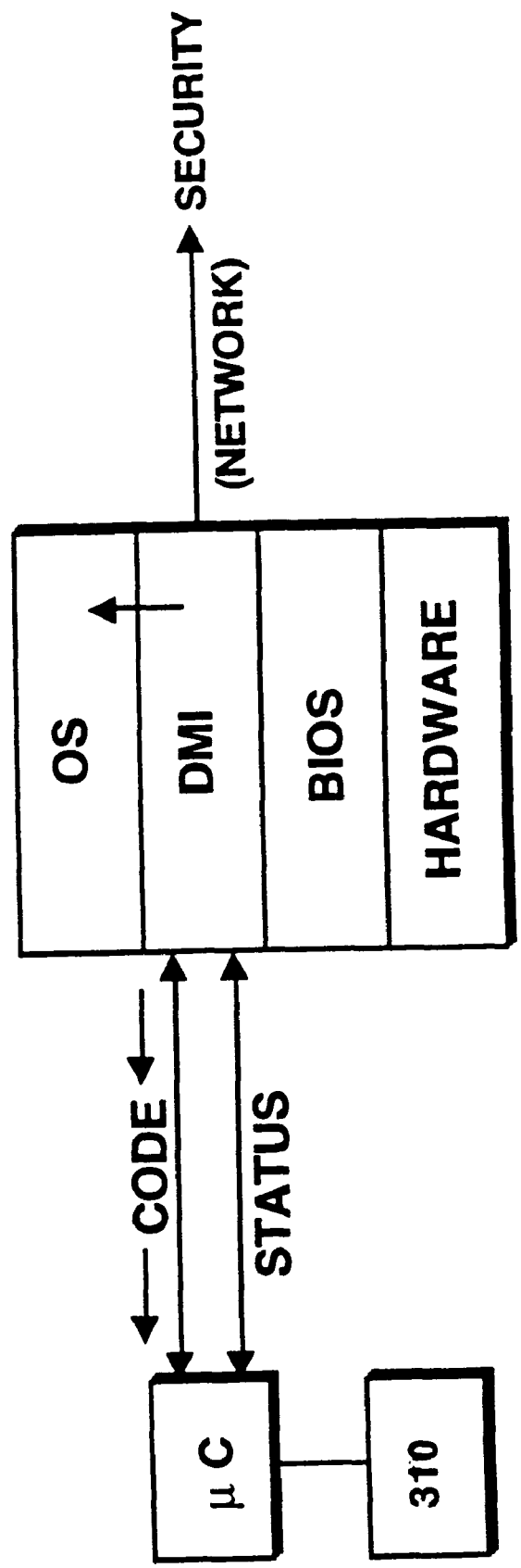
FIG. 4 is a block diagram illustrating the software interface between the cabinet security state detection system and the operating system.
Figure 3:
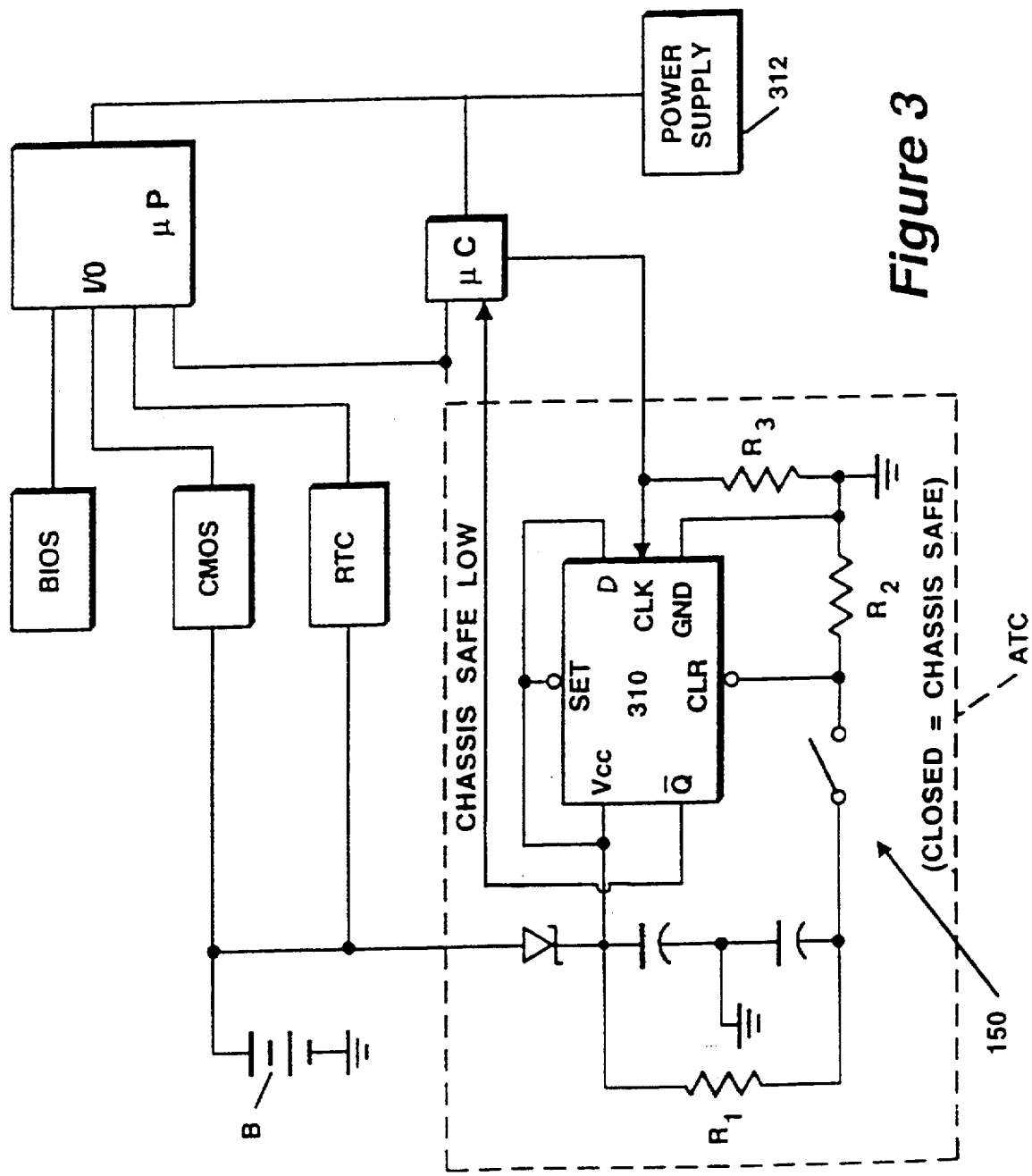
Figure 4:
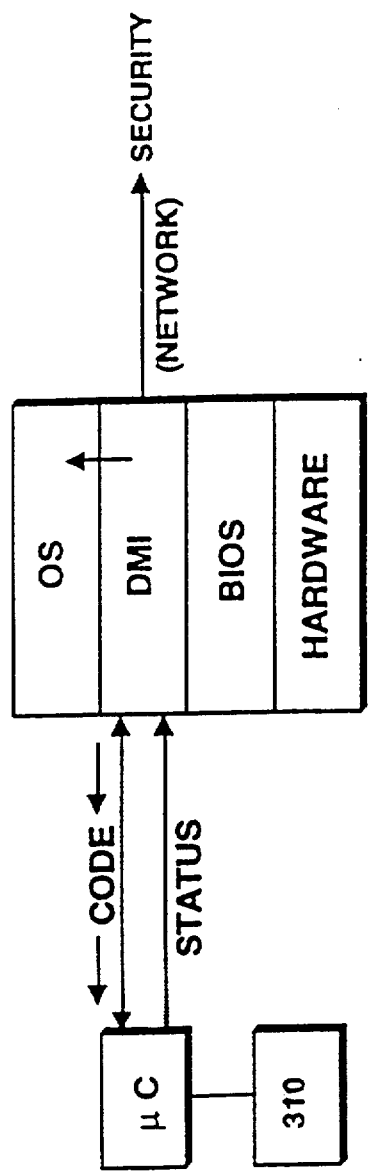

FIG. 4 is a block diagram illustrating the control structure for a computer. The BIOS operates as the basic input/out system for controlling the hardware. Between the BIOS and operating system, a desktop management interface DMI polls the status of the auxiliary state element 310 via the microcontroller $\mu C$ and notifies or reports to the computer's operator via the operating system OS or possibly security personnel via a computer network so that proper steps may be taken in the event of the unauthorized opening of the computer cabinet. Upon receiving the proper code from the operating system OS, the microcontroller $\mu C$ resets the element 310 to indicate the cabinet safe state.

In another embodiment, the D-flip-flop 310 is powered by a capacitor that is charged when the computer is operational. Using a reasonably sized capacitor, the D-flip-flop 310 can be powered for up to five hours. This configuration has the advantage that it does not add to the battery drain of the real time clock battery B. It has a disadvantage that regardless of whether the cabinet is opened, an unsafe condition is indicated after several hours when the capacitor is fully discharged.

While this invention has been particularly shown and described with references to preferred embodiments thereof, it will be understood by those skilled in the art that various changes in form and detail may be made therein without departing from the spirit and scope of the invention as defined by the appended claims.

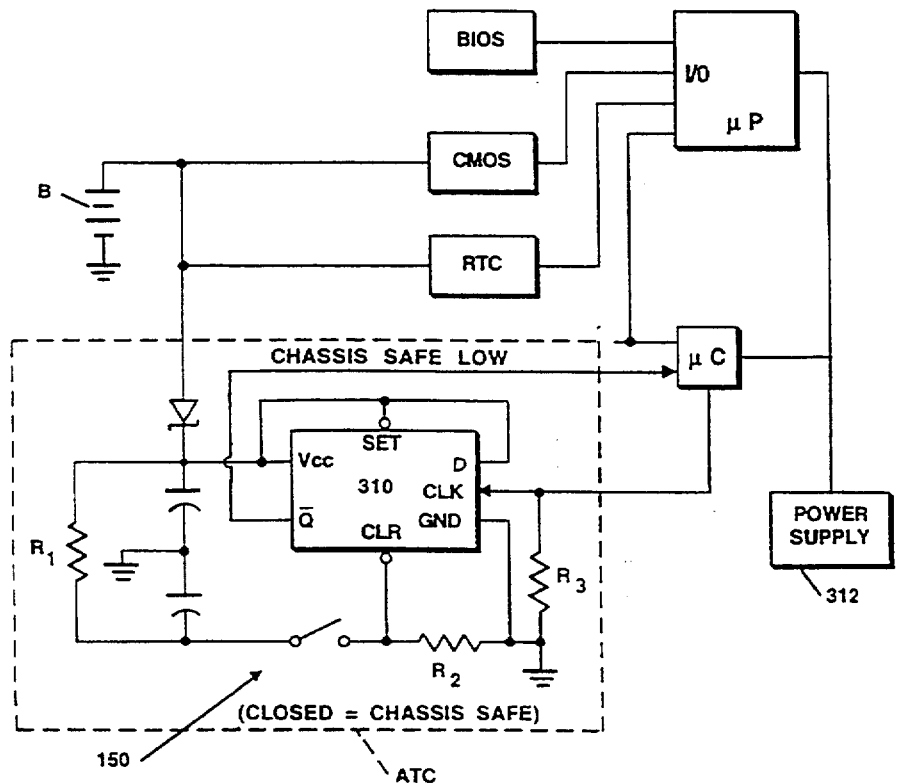

What is claimed is:

1. A tamper detection system for a computer including a chassis and electronic hardware contained in the chassis, the tamper detection system comprising:
    a switch that is responsive to the chassis being opened to expose the electronic hardware;
    an auxiliary state element that changes state in response to the switch regardless of whether the computer is operational; and
    a reporting program that runs on an operating system of the computer to poll the state of the auxiliary state element when the computer is operational to provide notification regarding a safe or unsafe condition of the chassis.

2. The tamper detection system described in claim 1, wherein the computer further includes a real time clock and a battery that powers the real time clock, and the auxiliary state element means is powered by the battery.

3. The tamper detection system described in claim 1, further comprising a capacitive element for powering the auxiliary state element means while the computer is not operational.

4. The tamper detection system described in claim 1, wherein the auxiliary state element means comprises a single bit memory device that is reset by the switch.

5. The tamper detection system described in claim 1, wherein the auxiliary state element means comprises a flip-flop.

6. The tamper detection system described in claim 1, further comprising a controller that functions as an intermediary between the auxiliary state element means and an operating system of the computer to detect the state of and reset the auxiliary state element means.

7. The tamper detection system described in claim 6, wherein the controller resets the auxiliary state element means only in response to receiving a predetermined code from the operating system.

8. A method for detecting tampering in a computer, the method comprising:
   detecting a chassis of the computer being opened to expose the electronic hardware;
   setting an auxiliary state element in response to detecting chassis opening regardless of whether the computer is operational; and
   polling, with a reporting program running on a central processing unit of the computer, a state of the auxiliary state element when the computer is operational to provide notification regarding a safe or unsafe condition of the chassis.

9. The method described in claim 8, further comprising powering the auxiliary state element with a battery that also powers a real time clock.

10. The method described in claim 8, further comprising powering the auxiliary state element means with a capacitive element while the computer is not operational.

11. The method system described in claim 8, further comprising constructing the auxiliary state element means from a single bit memory device that is reset by a switch connected to the chassis.

12. The method described in claim 8, further comprising constructing the auxiliary state element means from a flip-flop.

13. The method described in claim 8, further comprising controlling the auxiliary state element means with a controller that functions as an intermediary between the auxiliary state element means and an operating system of the computer.

14. The method described in claim 13, further comprising detecting a state of and resetting the auxiliary state element means via the controller.

15. The method described in claim 13, further comprising resetting the auxiliary state element means via the controller only in response to the controller receiving a predetermined code from the operating system.

* * * * *

UNITED STATES PATENT AND TRADEMARK OFFICE
CERTIFICATE OF CORRECTION

PATENT NO. : 5,912,621
DATED : June 15, 1999
INVENTOR(S) : Thomas Joseph Schmidt It is certified that error appears in the above-identified patent and that said Letters Patent is hereby corrected as shown below:

In column 3, line 21, replace "C" with --CLR--;
In column 3, line 30, replace "(closed)" with --(opened)--;
In column 3, line 31, replace "C" with --CLR--;
Please replace Sheet 3 of 4 with the attached corrected Figure 3;
Please replace Sheet 4 of 4 with the attached corrected Figure 4.
The title page showing the illustrative figure should
be replaced with the attached title page.

Signed and Sealed this

Thirteenth Day of February, 2001

*Attest:*

NICHOLAS P. GODICI

*Attesting Officer*   Acting Director of the United States Patent and Trademark Office

United States Patent [19]

Schmidt

[11] Patent Number: 5,912,621
[45] Date of Patent: Jun. 15, 1999

[54] CABINET SECURITY STATE DETECTION

[75] Inventor: Thomas Joseph Schmidt, Milford, N.H.

[73] Assignee: Digital Equipment Corporation, Houston, Tex.

[21] Appl. No.: 08/892,138

[22] Filed: Jul. 14, 1997

[51] Int. Cl.$^6$ .................................................. G08B 13/14
[52] U.S. Cl. ......................... 340/571; 340/568.1; 380/4
[58] Field of Search .................................. 340/540, 541, 340/542, 545, 691, 825.25, 825.31, 568, 571, 687, 568.1; 380/4, 23, 25, 50, 52; 395/186, 188.01

[56] References Cited

U.S. PATENT DOCUMENTS

| | | | |
|---|---|---|---|
| 3,969,584 | 7/1976 | Miller et al. | 340/542 |
| 4,797,663 | 1/1989 | Rios | 340/691 |
| 4,825,200 | 4/1989 | Evans et al. | 340/825.56 |
| 5,189,396 | 2/1993 | Stobbe | 340/541 |
| 5,287,519 | 2/1994 | Dayan et al. | 340/825.31 |
| 5,311,450 | 5/1994 | Ojima | 364/550 |
| 5,317,304 | 5/1994 | Choi | 340/571 |
| 5,341,322 | 8/1994 | Blackledge, Jr. et al. | 380/4 |
| 5,353,015 | 10/1994 | Robinson | 340/686 |
| 5,388,156 | 2/1995 | Blackledge, Jr. et al. | 380/4 |
| 5,450,271 | 9/1995 | Fukushima et al. | 361/686 |
| 5,515,030 | 5/1996 | Citron et al. | 340/545 |
| 5,555,156 | 9/1996 | Decante | 340/825.31 |
| 5,555,373 | 9/1996 | Dayan et al. | 395/188.01 |
| 5,574,786 | 11/1996 | Dayan et al. | 380/4 |
| 5,748,083 | 5/1998 | Rietkerk | 340/568 |

Primary Examiner—Daniel J. Wu
Assistant Examiner—Van T. Trieu
Attorney, Agent, or Firm—Hamilton, Brook, Smith & Reynolds, P.C.

[57] ABSTRACT

A computer cabinet tamper detection system includes a switch that is responsive to the chassis being opened to expose the electronic hardware and an auxiliary state element that changes state in response to the switch. A reporting program runs on the hardware to poll the state of the auxiliary state element when the computer is operational to provide notification regarding a safe or unsafe condition of the chassis. This allows the computer operator and the organization to take steps to contain any damage associated with the possible prejudicing of the computer's security.

15 Claims, 4 Drawing Sheets